United States Patent [19]

Harpell

[11] Patent Number: 5,196,252
[45] Date of Patent: Mar. 23, 1993

[54] BALLISTIC RESISTANT FABRIC ARTICLES

[75] Inventor: Gary A. Harpell, Morristown, N.J.

[73] Assignee: Allied-Signal, Morristown, N.J.

[21] Appl. No.: 615,516

[22] Filed: Nov. 19, 1990

[51] Int. Cl.$^5$ .............................................. B32B 5/06
[52] U.S. Cl. ..................................... 428/102; 428/109;
428/114; 428/911; 428/902; 2/2.5; 89/36.02;
89/36.05; 109/80; 109/84
[58] Field of Search ............... 428/103, 911, 102, 109,
428/114, 902; 2/2.5; 109/80, 84; 89/36.02,
36.05

[56] References Cited

U.S. PATENT DOCUMENTS

| | | | |
|---|---|---|---|
| 3,353,187 | 11/1967 | Lastnik et al. | 2/412 |
| 3,357,985 | 2/1983 | Harpell | 428/224 |
| 3,562,810 | 2/1971 | Davis | 2/2.5 |
| 3,582,988 | 6/1971 | Armellino | 2/2.5 |
| 3,641,638 | 2/1972 | Laible | 28/112 |
| 3,832,265 | 8/1974 | Denommee | 428/251 |
| 3,855,632 | 12/1974 | Dairs | 2/2.5 |
| 3,971,072 | 7/1976 | Armellino | 2/2.5 |
| 3,988,780 | 11/1976 | Armellino | 2/2.5 |
| 4,183,097 | 1/1980 | Mellian | 2/2.5 |
| 4,403,012 | 3/1982 | Harpell | 428/290 |
| 4,413,110 | 3/1982 | Kavesh | 526/348 |
| 4,443,506 | 4/1984 | Schmolmann et al. | 428/102 |
| 4,457,985 | 7/1984 | Harpell et al. | 428/224 |
| 4,501,856 | 2/1985 | Harpell et al. | 525/240 |
| 4,510,200 | 4/1985 | Samowich | 428/252 |
| 4,522,871 | 6/1985 | Armellino, Jr. et al. | 428/252 |
| 4,543,286 | 9/1985 | Harpell et al. | 428/288 |
| 4,563,392 | 1/1986 | Harpell et al. | 428/394 |
| 4,608,717 | 9/1986 | Dunbavand | 2/2.5 |
| 4,613,535 | 9/1986 | Harpell et al. | 428/113 |
| 4,623,574 | 11/1986 | Harpell et al. | 428/113 |
| 4,650,710 | 3/1987 | Harpell et al. | 428/263 |
| 4,681,792 | 7/1987 | Harpell et al. | 428/102 |
| 4,737,401 | 4/1988 | Harpell et al. | 428/252 |
| 4,737,402 | 4/1988 | Harpell et al. | 428/525 |
| 4,748,064 | 5/1988 | Harpell et al. | 428/113 |
| 4,916,000 | 4/1990 | Li et al. | 428/105 |
| 4,923,728 | 5/1990 | Snedeker | 428/52 |
| 4,989,266 | 2/1991 | Borgese et al. | 2/2.5 |

FOREIGN PATENT DOCUMENTS

| | | |
|---|---|---|
| 241681 | 3/1986 | European Pat. Off. |
| 291859 | 11/1988 | European Pat. Off. |
| 2369916 | 6/1978 | France |
| 8906190 | 7/1989 | PCT Int'l Appl. |
| 2130073 | 5/1984 | United Kingdom |
| 2227450 | 8/1990 | United Kingdom |

*Primary Examiner*—Donald P. Walsh
*Assistant Examiner*—Ngoclan T. Mai
*Attorney, Agent, or Firm*—R. C. Stewart, II; G. H. Fuchs; D. L. Webster

[57] ABSTRACT

A flexible article of manufacture especially suitable for use as a ballistic resistant body armor which comprises a flexible substrate layer having a plurality of planar non-metallic bodies mechanically affixed to a surface thereof.

51 Claims, 6 Drawing Sheets

BALLISTIC RESISTANT FABRIC ARTICLES

BACKGROUND OF THE INVENTION

1. Field of the Invention

This invention relates to ballistic resistant fabric articles. More particularly, this invention relates to flexible ballistic resistant articles having improved ballistic protection.

2. Prior Art

Ballistic articles such as bulletproof vests, helmets, structural members of helicopters and other military equipment, vehicle panels, briefcases, raincoats and umbrellas containing high strength fibers are known. Fibers conventionally used include aramid fibers such as poly(phenylenediamine terephthalamide), graphite fibers, nylon fibers, ceramic fibers, glass fibers and the like. For many applications, such as vests or parts of vests, the fibers are used in a woven or knitted fabric. For many of the applications, the fibers are encapsulated or embedded in a matrix material.

U.S. Pat. Nos. 4,623,574 and 4,748,064 disclose a simple composite structure comprising high strength fibers embedded in an elastomeric matrix. The simple composite structure exhibits outstanding ballistic protection as compared to simple composites utilizing rigid matrices, the results of which are disclosed in the patents. Particularly effective are simple composites employing ultra-high molecular weight polyethylene and polypropylene such as disclosed in U.S. Pat. No. 4,413,110.

U.S. Pat. Nos. 4,737,402 and 4,613,535 disclose complex rigid composite articles having improved impact resistance which comprise a network of high strength fibers such as the ultra-high molecular weight polyethylene and polypropylene disclosed in U.S. Pat. No. 4,413,110 embedded in an elastomeric matrix material and at least one additional rigid layer on a major surface of the fibers in the matrix. It is disclosed that the composites have improved resistance to environmental hazards, improved impact resistance and are unexpectedly effective as ballistic resistant articles such as armor.

U.S. Pat. No. 4,650,710 discloses a flexible article of manufacture comprising a plurality of first flexible layers arranged in a first portion of the article, each of said first layers consisting essentially of fibers having a tensile modulus at least abpit 300 g/denier and a tenacity of at least about 15 g/denier and a tenacity at least about 15 g/denier and a plurality of a second flexible layers arranged in a second portion of said article, each of said second flexible layers comprising fibers, the resistance to displacement of fibers in each of said second flexible layers being greater than the resistance to displacement in each of said first flexible layers.

Other ballistic resistant articles are described in U.S. Pat. Nos. 4,916,000; 4,403,012, 4,457,985; 4,737,401; 4,543,286; 4,563,392 and 4,501,856.

SUMMARY OF THE INVENTION

The present invention provides a flexible article of manufacture comprising, at least one substrate layer having a plurality of rigid planar "penetration resistant" non-metallic bodies affixed to a surface thereof.

Several advantages flow from this invention. For example, the article of this invention exhibits relatively improved penetration resistance as compared to fibrous articles of the same areal density without adversely affecting the flexibility of the article unduly. Moreover, for the article of this invention minimal loss in puncture resistance occurs when wet as compared to conventional puncture resistant fibers. Through use of this invention, relatively higher denier yarn can be employed in the manufacture of the articles of this invention without unduly affecting the penetration resistance of the article. The article of this invention provides a higher degree of penetration resistance than articles of the same areal density constructed solely of the substrate material.

BRIEF DESCRIPTION OF THE DRAWINGS

The invention will be more fully understood and further advantages will become apparent when reference is made to the following detailed description of the invention and the accompanying drawings in which.

DETAILED DESCRIPTION OF THE PREFERRED EMBODIMENTS OF THE INVENTION

The preferred invention will be better understood by those of skill in the art by reference to the above figures. The preferred embodiments of this invention illustrated in the figures are not intended to be exhaustive or to limit the invention to the precise form disclosed. It is chosen to describe or to best explain the principles of the invention and its application and practical use to thereby enable others skilled in the art to best utilize the invention.

In its broadest aspects, the invention is directed to a multilayered fiber containing article of manufacture comprising at least one flexible substrate having a plurality of rigid "penetration resistant" non-metallic planar bodies mechanically affixed to a surface thereof. The article of this invention exhibits improved penetration resistance when said article is impacted by a projectile without adversely affecting the flexibility of the article to an undue extent.

As used herein, the "penetration resistance" of the article is the resistance to penetration by a designated threat, as for example, a bullet an ice pick, a knife or the like. The penetration resistance can be expressed as the ratio of peak force (F) for designated threat (projectile, velocity, and other threat parameters known to those of skill in the art to effect peak force) divided by the areal density (ADT) of the target. As used herein, the "peak force", is the maximum force exerted by a threat to penetrate a designated target using a model 1331 high speed Instron high speed tester having an impact velocity of about 12/s (3.66 m/s) and where the target strike face area has a diameter of 3 in.(7.6 cm) (See Example 4); and as used herein, the "areal density" or "ADT" is the ratio of total target weight to the area of the target strike face area.

The flexibility of the articles of the present invention can be demonstrated by clamping a 30 cm square sample of the article horizontally along one side edge with an overhang of 20 cm, and measuring the amount of drape of the article (the amount of drape being measured by the distance between the level of the clamped side edge and the opposite edge). For flexible articles of this invention, the amount of drape is ordinarily at least about 8 cm, preferably at least about 10 cm, more preferably at least about 13 cm and most preferably at least about 17 cm.

Figure 1:
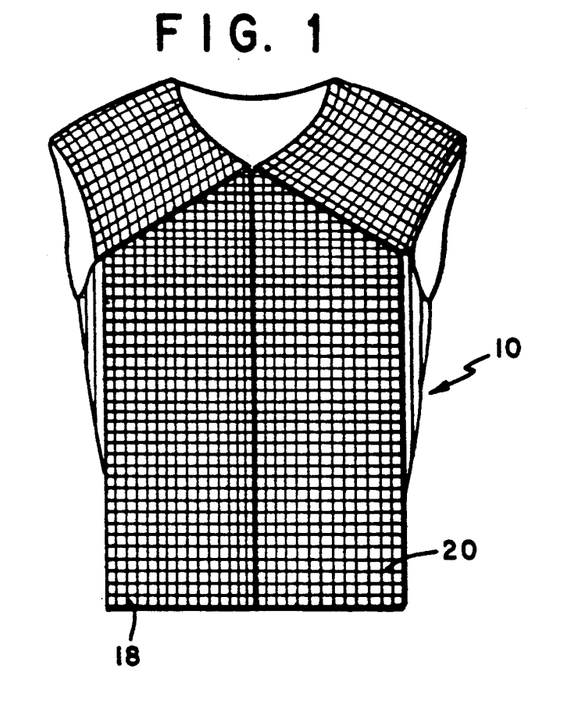
FIG. 1 is a front perspective view of a preferred embodiment of the article of this invention.
Figure 2:
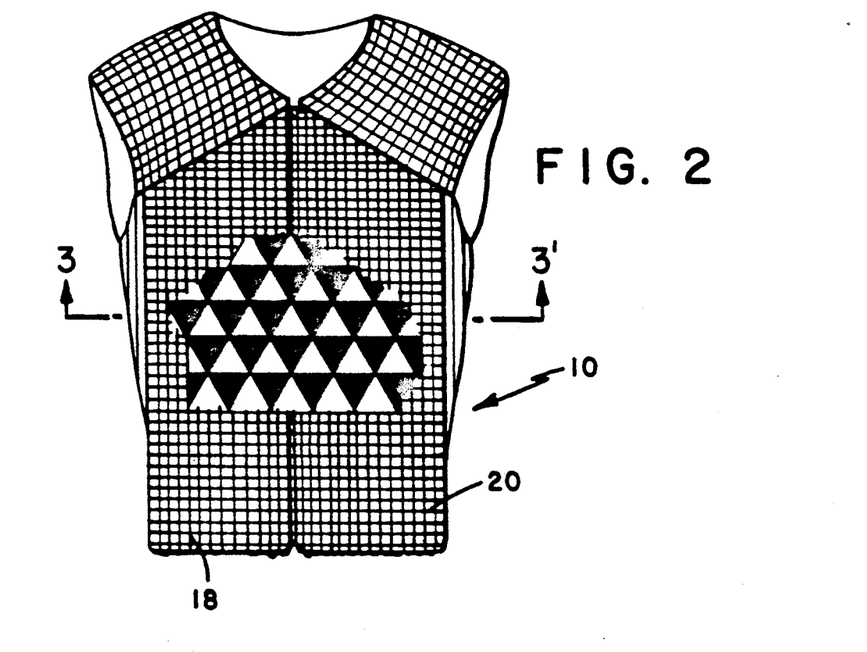
FIG. 2 is a front perspective view of the embodiment of FIG. 1 having certain selected components cut away for purpose of illustration.
Figure 3:
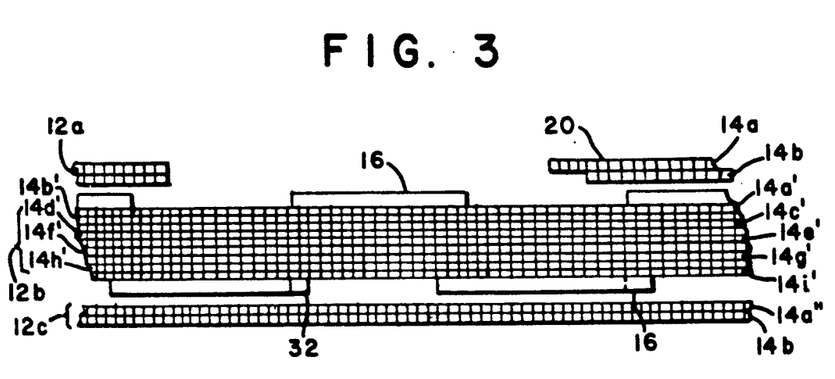
FIG. 3 is an enlarged fragmentary sectional view of the body armor of this invention of FIG. 2 taken on line 3—3 which includes a plurality of rigid ballistic resistant elements on outer surfaces of a plurality of fibrous layers.
Figure 4:
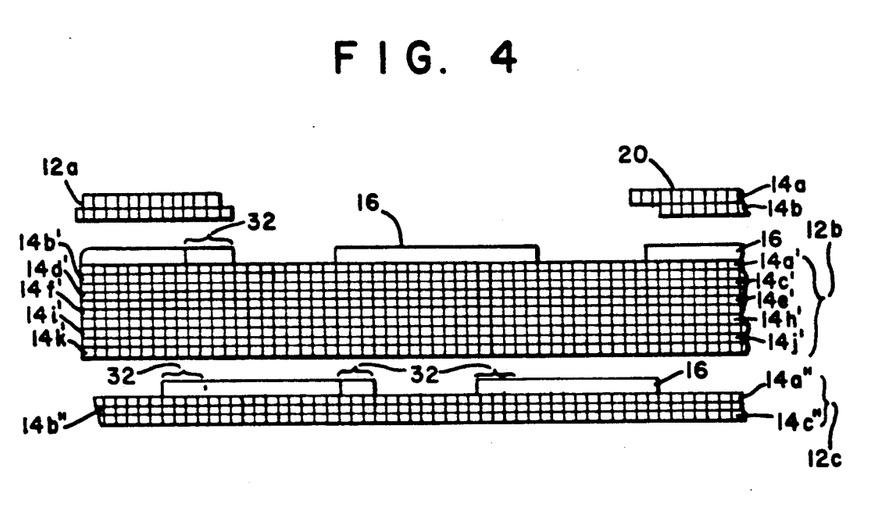
FIG. 4 is an enlarged fragmental sectional view of the body armor of this invention FIG. 2 taken on line 3—3 which includes a plurality of rigid ballistic elements on one side of two fibrous layers.

Referring to FIGS. 1, 2 and 3, the numeral 10 indicates a ballistic resistant article 10, which in this preferred embodiment of the invention is ballistic resistant body armor. As depicted in FIG. 2, article 10 is comprised of one or more layers 12. At least one layer 12 comprises one or more substrate layers 14 having a plurality of non-metallic penetration resistant planar bodies 16 affixed to a surface thereof. As depicted in FIG. 2, 3 and 4, article 10 is comprised of three layers 12a to 12c. Layers 12a include two layers 14a and 14b, layer 12b includes nine layers 14a' and 14i' and layer 12c includes two layers 14a'' and 14b''. However, the number of layers 12 and substrate layers 14 included in article 10 may vary widely, provided that at least two layers are present. In general, the number of layers in any embodiment will vary depending on the degree of penetration resistance and flexibility desired. The number layers 12 and substrate layers 14 is preferably from 2 to about 70, more preferably from about 5 to about 60 and most preferably from about 20 to about 50.

As shown in FIGS. 1, 2, 3 and 4 substrate layers 14 are forming the various secured together by horizontal securing means 18 and vertical securing means 20. In the illustrative embodiments of the invention depicted in the figures is stitching; however, any conventional securing means may be used including but not limited to bolts, rivets, adhesive, staples, stitches, and the like. While in the embodiment of the figures all substrate layers 14 forming a fibrous layers 12 are secured together, it is contemplated that the number of layers 14 secured together may be as few as two, or any number of layers 14 in article 10 in any combination. In the preferred embodiments of the invention where the number of layers 14 is more than about 20, all the layers are not secured together. In these embodiments, from about 2 to about 20 layers, preferably from 2 to about 12 layers, more preferably from about 2 to about 10 layers and most preferably from about 2 to about 8 are secured together forming a plurality of packets (not depicted). These packets forming various fibrous layers 12 may in turn be secured together by a conventional securing means as described above.

In the preferred embodiments of the invention depicted in FIGS. 1 and 2, stitches 18 and 20 are utilized to secure substrate layers 12. The type of stitching employed may vary widely. Stitching and sewing methods such as lock stitching, chain stitching, zig-zag stitching and the like are illustrative of the type of stitching for use in this invention. An important feature of this invention is the tensile properties of the fiber used in stitching means 14 and 16. It has been found that a relatively high modulus (equal to or greater than about 200 grams/denier) and a relatively high tenacity (equal to or greater than about 5 grams/denier) fiber is essential for the beneficial effects of the invention. All tensile properties are evaluated by pulling a 10 in (25.4 cm) fiber length clamped in barrel clamps at a rate of 10 in/min (25.4 cm/min) on an Instron Tensile Tester. In the preferred embodiments of the invention, the tensile modulus is from about 400 to about 3000 grams/denier and the tenacity is from about 20 to about 50 grams/denier, more preferably the tensile modulus is from about 1000 to about 3000 grams/denier and the tenacity is from about 25 to about 50 grams/denier and most preferably the tensile modulus is from about 1500 to about 3000 grams/denier and the tenacity is from about 30 to about 50 grams/denier.

Useful threads and fibers may vary widely and will be described in more detail herein below in the discussion of fiber for use in the fabrication of fibrous layers 12. However, the thread or fiber used in stitching means 14 and 16 is preferably an aramid fiber or thread (as for example Kevlar ® 29, 49, 129 and 149 aramid fibers), an extended chain polyethylene thread or fiber (as for example Spectra ® 900 and Spectra ® 1000 polyethylene fibers) or a mixture thereof.

The areal density of substrate layer(s) 14 may vary widely. In general, for ballistic body armor applications, the areal density is equal to or less than about 12 kg/m². In the preferred embodiments of the invention, the areal density is equal to or less than about 7 kg/m², and in the more preferred embodiments of the invention, the areal density is from about 3 to about 6.5 kg/m². In the most preferred embodiments of the invention, the areal density is from about 3.5 to about 6.2 kg/m².

Substrate layer 14 may vary widely, the only requirement is that it be flexible as defined above. For example, substrate layer 14 may be a flexible polymeric or elastomeric is film formed from a thermoplastic or elastomeric resin. Such thermoplastic and elastomeric resins for use in the practice of this invention may vary widely. Illustrative of useful thermoplastic resins are polylactones such as poly(pivalolactone), poly(ε- caprolactone) and the like; polyurethanes derived from reaction of diisocyanates such as 1,5-naphthalene diisocyanate, p-phenylene diisocyanate, m-phenylene diisocyante, 2,4-toluene diisocyanate, 4-4' diphenylmethane diisocyanate, 3-3'dimethyl-4,4'biphenyl diisocyanate, 4,4'diphenylisopropylidiene diisocyanate, 3,3'-dimethyl-4,4' diphenyl diisocyanate, 3,3'-dimethyl-4,4'-diphenylmethane diisocyanate, 3,3-dimethoxy-4,4'-biphenyl diisocyanate, dianisidine diisocyanate, tolidine diisocyanate, hexamethylene diisocyanate, 4,4'-diisocyananodiphenylmethane and the like and linear long-chain diols such as poly(tetramethylene) adipate), poly(1,5-pentylene adipate), poly(1,3 butylene adipate), poly(ethylene succinate), poly(2,3-butylene succinate), polyether diols and the like; polycarbonates such as poly[methane bis (4-phenyl) carbonate], poly[1,1-ether bis(4-phenyl) carbonate], poly[diphenylmethane bis (4-phenyl carbonate], poly[1,1-cyclohexane bis[4-phenyl) carbonate] and the like; poly sulfones; polyether ether ketones; polyamides such as poly(4-amino butyric acid), poly(hexamethylene adipamide), poly(6-aminohexanoic acid), poly(m-xylylene adipamide), poly(p-xylylene sebacamide), poly [2,2,2-trimethyl hexamethylene terephthalamide), poly(meta-phenyleneisophthalamide) (Nomex®), poly(p-phenylene terephthalamide) (Kevlar®), and the like; polyesters such as poly(ethylene azelate), poly(ethylene-1,5-naphthalate), poly(1,4-cyclohexane dimethylene terephthalate), poly(ethylene oxybenzoate) (A-Tell®), poly(para-hydroxy benzoate) (Ekonol®),(poly(1,4-cyclohexylidene dimethylene terephthalate) (Kodel®) (as), poly(1,4-terephathalate cyclohexylidene dimethylene terephthalate) (Kodel) (trans), polyethylene terephthalate, polybutylene terephthalate and the like; poly(arylene oxides) such as poly(2,6-dimethyl-1,4-phenylene oxide), poly(2,6-diphenyl-1,4-phenylene oxide), and the like; poly(arylene sulfides) such as poly(phenylene sulfide) and the like; polyetherimides; thermoplastic elastomers such as polyurethane elastomer, fluoroelastomers, butadiene/acrylonitrile elastomers, silicone elastomers, polybutadiene, polyisobutylene, ethylene-propylene copolymers, ethylene-propylene-diene terpolymers, polychloroprene, polysulfide elastomers, block copolymers, made up of segments of glassy or crystalline blocks such as polystyrene, poly(vinyl-toluene), poly(t-butyl styrene), polyester and the like and the elastomeric blocks such as polybutadiene, polyisoprene, ethylene-propylene copolymers, ethylene-butylene copolymers, polyether ester and the like as for example the copolymers in polystrene-polybutadiene-polystyrene block copolymer manufactured by Shell Chemical Company under the trade name of Kraton; vinyl polymers and their copolymers such as polyvinyl acetate, polyvinyl alcohol, polyvinyl chloride, polyvinyl butyral, polyvinylidene chloride, ethylene-vinyl acetate copolymers, and the like; polyacrylics, polyacrylate and their copolymers such as polyethyl acrylate, poly(n-butyl acrylate), polymethyl methacrylate, polyethyl methacrylate, poly(n-butyl methacrylate), poly(n-propyl methacrylate), polyacrylamide, polyacrylonitrile, polyacrylic acid, ethylene-acrylic acid copolymers, methyl methacrylate-styrene copolymers, ethylene-ethyl acrylate copolymers, methacrylated budadiene-styrene copolymers and the like; polyolefins such as low density polyethylene, polypropylene, chlorinated low density polyethylene, poly(4-methyl-1-pentene) and the like; ionomers; and polyepichlorohydrins; polycarbonates and the like.

Substrate layer 14 may also comprises a network of fibers, either alone or dispersed in a polymeric matrix. For purposes of the present invention, fiber is defined as an elongated body, the length dimension of which is much greater than the dimensions of width and thickness. Accordingly, the term fiber as used herein includes a monofilament elongated body, a multifilament elongated body, ribbon, strip, and the like having regular or irregular cross sections. The term fibers includes a plurality of any one or combination of the above.

The cross-section of fibers for use in this invention may vary widely. Useful fibers may have a circular cross-section, oblong cross-section or irregular or regular multi-lobal cross-section having one or more regular or irregular lobes projecting from the linear or longitudinal axis of the fibers. In the particularly preferred embodiments of the invention, the fibers are of substantially circular or oblong cross-section and in the most preferred embodiments are of circular or substantially circular cross-section.

Substrate layer 14 may also be formed from fibers alone, or from fibers coated with a suitable polymer, as for example, a polyolefin, polyamide, polyester, polydiene such as a polybutadiene, urethanes, diene/olefin copolymers, such as poly(styrene-butadiene-styrene) block copolymers, and a wide variety of elastomers. Fibrous layer 14 may also comprise a network of a fibers dispersed in a polymeric matrix as for example a matrix of one or more of the above referenced polymers to form a flexible composite as described in more detail in U.S. Pat. Nos. 4,623,574; 4,748,064; 4,916,000; 4,403,012; 4,457,985; 4,650,710; 4,681,792; 4,737,401; 4,543,286; 4,563,392; and 4,501,856. Regardless of the construction, fibrous layer 14 is such that article 10 has the required degree of flexibility.

The fibers in substrate layer 14 may be arranged in networks having various configurations. For example, a plurality of filaments can be grouped together to form twisted or untwisted yarn bundles in various alignments. The filaments or yarn may be formed as a felt, knitted or woven (plain, basket, satin and crow feet weaves, etc.) into a network, fabricated into non-woven fabric, arranged in parallel array, layered, or formed into a woven fabric by any of a variety of conventional techniques. Among these techniques, for ballistic resistance applications we prefer to use those variations commonly employed in the preparation of aramid fabrics for ballistic-resistant articles. For example, the techniques described in U.S. Pat. No. 4,181,768 and in M. R. Silyquist et al., *J. Macromol Sci. Chem.*, A7(1), pp. 203 et. seq. (1973) are particularly suitable.

The type of fibers used in the fabrication of substrate layer 14 may vary widely and can be inorganic or organic fibers. Preferred fibers for use in the practice of this invention are those having a tenacity equal to or greater than about 10 g/d, (as measured by an Instron Tensile Testing Machine) a tensile modulus equal to or greater than about 150 g/d (as measured by an Instron Tensile Testing Machine) and an energy-to-break equal to or greater than about 8 joules/gram. Particularly preferred fibers are those having a tenacity equal to or greater than about 20 g/d, a tensile modulus equal to or greater than about 500 g/d and energy-to-break equal to or greater than about 30 joules/grams. Amongst these particularly preferred embodiments, most preferred are those embodiments in which the tenacity of the fibers are equal to or greater than about 25 g/d, the tensile modulus is equal to or greater than about 1000 g/d, and the energy-to-break is equal to or greater than about 35 joules/grams. In the practice of this invention, fibers of choice have a tenacity equal to or greater than about 30 g/d, the tensile modulus is equal to or greater than about 1300 g/d and the energy-to-break is equal to or greater than about 40 joules/grams.

The denier of the fiber may vary widely. In general, fiber denier is equal to or less than about 4000. In the preferred embodiments of the invention, fiber denier is from about 10 to about 4000, the more preferred embodiments of the invention fiber denier is from about 10 to about 1000 and in the most preferred embodiments of the invention, fiber denier is from about 10 to about 400.

Useful inorganic fibers include S-glass fibers, E-glass fibers, carbon fibers, boron fibers, alumina fibers, zirconia silica fibers, alumina-silicate fibers and the like.

Illustrative of useful organic fibers are those composed of polyesters, polyolefins, polyetheramides, fluoropolymers, polyethers, celluloses, phenolics, polyesteramides, polyurethanes, epoxies, aminoplastics, polysulfones, polyetherketones, polyetherether-ketones, polyesterimides, polyphenylene sulfides, polyether acryl ketones, poly(amideimides), and polyimides. Illustrative of other useful organic filaments are those composed of aramids (aromatic polyamides), such as poly(m-xylylene adipamide), poly(p-xylylene sebacamide), poly 2,2,2-trimethylhexamethylene terephthalamide), poly (piperazine sebacamide), poly (metaphenylene isophthalamide) (Nomex) and poly (p-phenylene terephthalamide) (Kevlar); aliphatic and cycloaliphatic polyamides, such as the copolyamide of 30% hexamethylene diammonium isophthalate and 70% hexamethylene diammonium adipate, the copolyamide of up to 30% bis-(-amidocyclohexyl)methylene, terephthalic acid and caprolactam, polyhexamethylene adipamide (nylon 66), poly(butyrolactam) (nylon 4), poly (9-aminononanoic acid) (nylon 9), poly(enantholactam) (nylon 7), poly(capryllactam) (nylon 8), polycaprolactam (nylon 6), poly (p-phenylene terephthalamide), polyhexamethylene sebacamide (nylon 6,10), polyaminoundecanamide (nylon 11), polydodeconolactam (nylon 12), polyhexamethylene isophthalamide, polyhexamethylene terephthalamide, polycaproamide, poly(nonamethylene azelamide) (nylon 9,9), poly(decamethylene azelamide) (nylon 10,9), poly(decamethylene sebacamide) (nylon 10,10), poly[bis-(4-aminocyclohexyl) methane 1,10-decanedicarboxamide] (Qiana) (trans), or combination thereof; and aliphatic, cycloaliphatic and aromatic polyesters such as poly(1,4-cyclohexlidene dimethyl eneterephathalate) cis and trans, poly(ethylene-1,5-naphthalate), poly(ethylene-2,6-naphthalate), poly(1, 4-cyclohexane dimethylene terephthalate) (trans), poly(decamethylene terephthalate), poly(ethylene terephthalate), poly(ethylene isophthalate), poly(ethylene oxybenzoate), poly(parahydroxy benzoate), poly(dimethylpropiolactone), poly(decamethylene adipate), poly(ethylene succinate), poly(ethylene azelate), poly(decamethylene sebacate), poly(-dimethyl-propiolactone), and the like.

Also illustrative of useful organic fibers are those of liquid crystalline polymers such as lyotropic liquid crystalline polymers which include polypeptides such as poly-γ-benzyl L-glutamate and the like; aromatic polyamides such as poly(1,4- benzamide), poly(chloro-1,4-phenylene terephthalamide), poly(1,4-phenylene fumaramide), poly(chloro-1,4-phenylene fumaramide), poly (4,4'-benzanilide trans, trans-muconamide), poly(1,4-phenylene mesaconamide), poly(1,4- phenylene) (trans-1,4-cyclohexylene amide), poly(chloro-1,4-phenylene) (trans-1,4-cyclohexylene cyclohexylene amide), poly(1,4-phenylene 2,5- pyridine amide), poly(chloro-1,4-phenylene 2,5-pyridine amide), poly(3,3'-dimethyl-4,4'-biphenylene 2,5 pyridine amide), poly(1,4-phenylene 4,4'-stilbene amide), poly(chloro-1,4-phenylene 4,4'-stilbene amide), poly(1,4-phenylene 4,4'-azobenzene amide), poly(4,4'-azobenzene 4,4'-azobenzene amide), poly(1,4-phenylene 4,4'-azoxybenzene amide), poly(4,4'- azobenzene 4,4'-azoxybenzene amide), poly(1,4-cyclohexylene 4,4'-azobenzene amide), poly(4,4'- azobenzene terephthal amide), poly(3,8-phenanthridinone terephthal amide), poly(4,4'-biphenylene terephthal amide), poly(4,4'-biphenylene 4,4'-bibenzo amide), poly(1,4-phenylene 4,4'-bibenzo amide), poly(1,4-phenylene 4,4'-terephenylene amide), poly(1,4-phenylene 2,6-naphthal amide), poly(1,5-naphthylene terephthal amide), poly(3,3'-dimethyl-4,4-biphenylene terephthal amide), poly(3,3'- dimethoxy-4,4'- biphenylene terephthal amide), poly(3,3'- dimethoxy-4,4-biphenylene 4,4'-bibenzo amide) and the like; polyoxamides such as those derived from 2,2'dimethyl-4,4'diamino biphenyl and chloro-1,4- phenylene diamine; polyhydrazides such as poly chloroterephthalic hydrazide, 2,5-pyridine dicarboxylic acid hydrazide) poly(terephthalic hydrazide), poly(terephthalic- chloroterephthalic hydrazide) and the like; poly(amide-hydrazides) such as poly(terephthaloyl 1,4 amino-benzhydrazide) and those prepared from 4-amino-benzhydrazide, oxalic dihydrazide, terephthalic dihydrazide and paraaromatic diacid chlorides; polyesters such as those of the compositions include poly(oxy-trans-1,4-cyclohexyleneoxycarbonyltrans-1,4-cyclohexylenecarbony 1-β-oxy-1,4-phenyleneoxyterephthaloyl) and poly(oxy-cis-1,4-cyclohexyleneoxycarbonyl-trans-1,4-cyclohexylenecarbonyl-β-oxy-1,4-phenyleneoxyterephthaloy 1) in methylene chloride-o-cresol poly[(oxy-trans-1,4- cyclohexyleneoxycarbonyl-trans -1,4-cyclohexylenecarbonyl-β-oxy-(2-methyl-1,4-phenylene)oxy-terephthaloyl)] in 1,1,2,2-tetrachloro- ethane-o-chlorophenol-phenol (60:25:15 vol/vol/vol), poly[oxy-trans-1,4-cyclohexyleneoxycarbonyl-trans-1,4-cyclohexylenecarbonyl-β-oxy(2-methyl-1,3-phenylene)oxyterephthaloyl] in o-chlorophenol and the like; polyazomethines such as those prepared from 4,4'-diaminobenzanilide and terephthaldehyde, methyl-1,4-phenylenediamine and terephthaldebyde and the like; polyisocyanides such as poly( -phenyl ethyl isocyanide), poly(n-octyl isocyanide) and the like; polyisocyanates such as poly(n-alkyl isocyanates) as for example poly(n-butyl isocyanate), poly(n-hexyl isocyanate) and the like; lyotropic crystalline polymers with heterocylic units such as poly(1,4-phenylene-2,6- benzobisthiazole)(PBT), poly(1,4- phenylene- 2,6-benzobisoxazole)(PBO), poly(1,4-phenylene-1 3,4-oxadiazole), poly(1,4-phenylene-2, 6-benzobisimidazole), poly[2,5(6)-benzimidazole] (AB-PBI), poly[2,6-(1,4-phenylene)-4- phenylquinoline], poly[1,1'-(4,4'-biphenylene)-6,6'-bis(4-phenylquinoline)] and the like; polyorganophosphazines such as polyphosphazine, polybisphenoxyphosphazine, poly[bis(2,2,2' trifluoroethylene) phosphazine] and the like; metal polymers such as those derived by condensation of trans-bis(tri-n-butylphosphine)platinum dichloride with a bisacetylene or trans-bis(tri-n-butylphosphine)bis(1,4- butadinynyl)-platinum and similar combinations in the presence of cuprous iodine and an amide; cellulose and cellulose derivatives such as esters of cellulose as for example triacetate cellulose, acetate cellulose, acetate-butyrate cellulose, nitrate cellulose, and sulfate cellulose, ethers of cellulose as for example, ethyl ether cellulose, hydroxymethyl ether cellulose, hydroxypropyl ether cellulose, carboxymethyl ether cellulose, ethyl hydroxyethyl ether cellulose, cyanoethylethyl ether cellulose, ether-esters of cellulose as for example acetoxyethyl ether cellulose and benzoyloxypropyl ether cellulose, and urethane cellulose as for example phenyl urethane cellulose; thermotropic liquid crystalline polymers such as celluloses and their derivatives as for example hydroxypropyl cellulose, ethyl cellulose propionoxypropyl cellulose, thermotropic liquid crystalline polymers such as celluloses and their derivatives as for example hydroxypropyl cellulose, ethyl cellulose propionoxypropyl cellulose; thermotropic copolyesters as for example copolymers of 6-hydroxy-2-naphthoic acid and p-hydroxy benzoic acid, copolymers of 6-hydroxy-2-naphthoic acid, terephthalic acid and p-amino phenol, copolymers of 6-hydroxy-2-naphthoic acid, terephthalic acid and hydroquinone, copolymers of 6-hydorxy-2-naphtoic acid, p-hydroxy benzoic acid, hydroquinone and terephthalic acid, copolymers of 2,6-naphthalene dicarboxylic acid, terephthalic acid, isophthalic acid and hydroquinone, copolymers of 2,6-naphthalene dicarboxylic acid and terephthalic acid, copolymers of p-hydroxybenzoic acid, terephthalic acid and 4,4'-dihydoxydiphenyl, copolymers of p-hydroxybenzoic acid, terephthalic acid, isophthalic acid and 4,4'-dihydroxydiphenyl, p-hydroxybenzoic acid, isophthalic acid, hydroquinone and 4,4'-dihydroxybenzophenone, copolymers of phenylterephthalic acid and hydroquinone, copolymers of chlorohydroquinone, terephthalic acid and p-acetoxy cinnamic acid, copolymers of chlorohydroquinone, terephthalic acid and ethylene dioxy-4,4'-dibenzoic acid, copolymers of hydroquinone, methylhydroquinone, p-hydroxybenzoic acid and isophthalic acid, copolymers of (1-phenylethyl)hydroquinone, terephthalic acid and hydroquinone, and copolymers of poly(ethylene terephthalate) and p-hydroxybenzoic acid; and thermotropic polyamides and thermotropic copoly(amide-esters).

Also illustrative of useful organic filaments for use in the fabrication of substrate layer 14 are those composed of extended chain polymers formed by polymerization of $\alpha,\beta$-unsaturated monomers of the formula:

$$R_1 R_2\text{-}C=CH_2$$

wherein:
$R_1$ and $R_2$ are the same or different and are hydrogen, hydroxy, halogen, alkylcarbonyl, carboxy, alkoxycarbonyl, heterocycle or alkyl or aryl either unsubstituted or substituted with one or more substituents selected from the group consisting of alkoxy, cyano, hydroxy, alkyl and aryl. Illustrative of such polymers of $\alpha,\beta$-unsaturated monomers are polymers including polystyrene, polyethylene, polyoctene, polypropylene, poly(1-octadecene), polyisobutylene, poly(1-pentene), poly(2-methylstyrene), poly(4-methylstyrene), poly(1-hexene), poly(1-pentene), poly(4-methoxystyrene), poly(5-methyl-1-hexene), poly(4-methylpentene), poly(1-butene), polyvinyl chloride, polybutylene, polyacrylonitrile, poly(methyl pentene-1), poly(vinyl alcohol), poly(vinyl-acetate), poly(vinyl butyral), poly(vinyl chloride), poly(vinylidene chloride), vinyl chloride-vinyl acetate chloride copolymer, poly(vinylidene fluoride), poly(methyl acrylate, poly(methyl methacrylate), poly(methacrylo-nitrile), poly(a-crylamide), poly(vinyl fluoride), poly(vinyl formal), poly(3-methyl-1-butene), poly(1-pentene), poly(4-methyl-1-butene), poly(1-pentene), poly(4-methyl-1-pentene, poly(1-hexene), poly(5-methyl-1-hexene), poly(1-octadecene), poly(vinyl-cyclopentane), poly(vinylcyclohexane), poly(a-vinylnaphthalene), poly(vinyl methyl ether), poly(vinylethylether), poly(vinyl propylether), poly(vinyl carbazole), poly(vinyl pyrrolidone), poly(2-chlorostyrene), poly(4-chlorostyrene), poly(vinyl formate), poly(vinyl butyl ether), poly(vinyl octyl ether), poly(vinyl methyl ketone), poly(methylisopropenyl ketone), poly(4-phenylstyrene) and the like.

In the most preferred embodiments of the invention, composite article 10 includes a fibrous substrate network, which may include high molecular weight polyethylene fibers, high molecular weight polypropylene fibers, aramid fibers, high molecular weight polyvinyl alcohol fibers, high molecular weight polyacrylonitrile fibers or mixtures thereof. U.S. Pat. No. 4,457,985 generally discusses such high molecular weight polyethylene and polypropylene filaments, and the disclosure of this patent is hereby incorporated by reference to the extent that it is not inconsistent herewith. In the case of polyethylene, suitable fibers are those of molecular weight of at least 150,000, preferably at least one million and more preferably between two million and five million. Such extended chain polyethylene (ECPE) fibers may be grown in solution as described in U.S. Pat. No. 4,137,394 to Meihuzen et al., or U.S. Pat. No. 4,356,138 of Kavesh et al., issued Oct. 26, 1982, or fiber spun from a solution to form a gel structure, as described in German Off. 3,004,699 and GB 2051667, and especially described in U.S. application Ser. No. 572,607 of Kavesh et al., filed Jan. 20, 1984 (see EPA 64,167, published Nov. 10, 1982). As used herein, the term polyethylene shall mean a predominantly linear polyethylene material that may contain minor amounts of chain branching or comonomers not exceeding 5 modifying units per 100 main chain carbon atoms, and that may also contain admixed therewith not more than about 50 wt % of one or more polymeric additives such as alkene-1-polymers, in particular low density polyethylene, polypropylene or polybutylene, copolymers containing mono-olefins as primary monomers, oxidized polyolefins, graft polyolefin copolymers and polyoxymethylenes, or low molecular weight additives such as anti-oxidants, lubricants, ultra-violet screening agents, colorants and the like which are commonly incorporated by reference. Depending upon the formation technique, the draw ratio and temperatures, and other conditions, a variety of properties can be imparted to these fibers. The tenacity of the filaments should be at least 15 grams/denier (as measured by an Instron Testing Machine) preferably at least 20 grams/denier, more preferably at least 25 grams/denier and most preferably at least 30 grams/denier. Similarly, the tensile modulus of the filaments, as measured by an Instron tensile testing machine, is at least 300 grams/denier, preferably at least 500 grams/denier and more preferably at least 1,000 grams/denier and most preferably at least 1,200 grams/denier. These highest values for tensile modulus and tenacity are generally obtainable only by employing solution grown or gel fiber processes.

Similarly, highly oriented polypropylene fibers of molecular weight at least 200,000, preferably at least one million and more preferably at least two million may be used. Such high molecular weight polypropylene may be formed into reasonably well oriented fibers by the techniques prescribed in the various references referred to above, and especially by the technique of U.S. Ser. No. 572,607, filed Jan. 20, 1984, of Kavesh et al. and commonly assigned. Since polypropylene is a much less crystalline material than polyethylene and contains pendant methyl groups, tenacity values achievable with polypropylene are generally substantially lower than the corresponding values for polyethylene. Accordingly, a suitable tenacity is at least 8 grams/denier (as measured by an Instron Tensile Testing Machine), with a preferred tenacity being at least 11 grams/denier. The tensile modulus for polypropylene is at least 160 grams/denier (as measured by an Instron Tensile Testing Machine) preferably at least 200 grams/denier. The particularly preferred ranges for the above-described parameters can advantageously provide improved performance in the final article.

High molecular weight polyvinyl alcohol fibers having high tensile modulus are described in U.S. Pat. No. 4,440,711 to Y. Kwon et al., which is hereby incorporated by reference to the extent it is not inconsistent herewith. In the case of polyvinyl alcohol (PV-OH), PV-OH fiber of molecular weight of at least about 200,000. Particularly useful Pv-OH fiber should have a tensile modulus of at least about 300 g/d, a tenacity of at least about 7 g/d (preferably at least about 10 g/d, more preferably at least about 14 g/d, and most preferably at least about 17 g/d), and an energy-to-break of at least about 8 joules/gram. PV-OH fibers having a weight average molecular weight of at least about 200,000, a tenacity of at least about 10 g/d, a tensile modulus of at least about 300 g/d, and an energy-to-break of about 8 joules/gram are more useful in producing a ballistic resistant article. Pv-OH fiber having such properties can be produced, for example, by the process disclosed in U.S. Pat. No. 4,599,267.

In the case of polyacrylonitrile (PAN), PAN fiber of molecular weight of at least about 400,000. Particularly useful PAN fiber should have a tenacity of at least about 10 g/d and an energy-to-break of at least about 8 joules/gram. PAN fiber having a molecular weight of at least about 400,000, a tenacity of at least about 15 to about 20 g/d and an energy-to-break of at least 8 joules/gram is most useful in producing ballistic resistant articles; and such fiber are disclosed, for example, in U.S. Pat. No. 4,535,027.

In the case of aramid fibers, suitable aramid fibers formed principally from aromatic polyamide are described in U.S. Pat. No. 3,671,542, which is hereby incorporated by reference. Preferred aramid fiber will have a tenacity of at least about 20 g/d (as measured by an Instron Tensile Testing Machine), a tensile modulus of at least about 400 g/d (as measured by an Instron Tensile Testing Machine) and an energy-to-break at least about 8 joules/gram, and particularly preferred aramid fibers will have a tenacity of at least about 20 g/d, a modulus of at least about 480 g/d and an energy-to-break of at least about 20 joules/gram. Most preferred aramid fibers will have a tenacity of at least about 20 g/denier, a modulus of at least about 900 g/denier and an energy-to-break of at least about 30 joules/gram. For example, poly(phenylene terephthalamide) fibers produced commercially by Dupont Corporation under the trade name of Kevlar ® 29, 49, 129 and 149 having moderately high moduli and tenacity values are particularly useful in forming ballistic resistant composites. Also useful in the practice of this invention is poly(metaphenylene isophthalamide) fibers produced commercially by Dupont under the tradename Nomex ®.

In the case of liquid crystal copolyesters, suitable fibers are disclosed, for example, in U.S. Pat. Nos. 3,975,487; 4,118,372; and 4,161,470, hereby incorporated by reference. Tenacities of about 15 to about 30 g/d (as measured by an Instron Tensile Testing Machine) and preferably about 20 to about 25 g/d, and tensile modulus of about 500 to 1500 g/d (as measured by an Instron Tensile Testing Machine) and preferably about 1000 to about 1200 g/d, are particularly desirable.

As depicted in FIGS. 1, 2 and 3, article 10 of this invention includes one or more planar bodies 16 sewn to a surface of one or more of substrate layers 14. Means for attaching planar bodies 16 to substrate layer 14 may vary widely and may include any means normally used in the art to provide this function. Illustrative of useful attaching means are adhesives such as those discussed in R. C. Liable, Ballistic Materials and Penetration Mechanics, Elsevier Scientific Publishing Co. (1980). Illustrative of other useful attaching means are bolts, screws, staples mechanical interlocks, stitching, or a combination of any of these conventional methods. As depicted in FIGS. 2, 5, 6 and 13 in the preferred embodiments of the invention planar bodies 16 are stitched to the surface of layer 14 by way of stitches 22 and eyes 24. Optionally, the stitching may be supplemented by adhesive.

As a ballistic missile impacts a planar body 20, the missile can be broken and/or enlarged and flattened to increase its impact area and decrease the velocity of the missile.

As depicted in FIG. 3, 4, 5, and 6 in cross-section, article 10 comprises three distinct layers 12a, 12b and 12c, each consisting of a plurality of substrate layers 14, stitched together by horizontal stitches 18 and vertical stitches 20 (not depicted). Layer 12a is the outer layer which is exposed to the environment, and layer 12c is the inner layer closest to the body of the wearer. The two covering layers 12a and 12c sandwich a ballistic layer 12b, which, in the body armor of the figures comprises a plurality of stitched substrate layers 14a' to 14k' (FIG. 4) and 14a' to 14i' (FIG. 3) having a plurality of planar bodies partially covering both outer surfaces of said plurality of layers 14 forming a pattern of covered areas 28 and uncovered areas 30 on the outer surfaces. As shown in FIG. 3, the plurality of planar bodies 26 are positioned on the two surfaces such that the covered areas 28 on one surface are aligned with the uncovered areas 30 on the other surface. In the preferred embodiments of the invention depicted in FIG. 3 and 4, each planar body 16 is uniformly larger than its corresponding uncovered area 30 such that planar bodies 16 adjacent to an uncovered area 30 partially overlap with the corresponding planar body 16 (of the area 30) on the other outer surface of the plurality of layers 14 by some portion 32. The degree of overlap may vary widely, but in general is such that preferably more than about 90 area %, more preferably more than about 95 area % and most preferably more than about 99 area % of the uncovered areas 30 on an outer surface of the plurality of layers 14 are covered by its corresponding planar body 16 on the other outer surface of the plurality of layers 14.

FIG. 4 depicts a variant of the embodiment of FIG. 3 which differs by placing planar bodies 16 on a surface of layer 12b and on a surface of layer 13c. Corresponding parts are referred to by like numerals.

As shown in the Figures, the position of planar bodies 20 can vary widely. For example, planar bodies 20 may be on an outside surface of a fibrous layer 12 or may be encapsulated inside of the plurality of fibrous layers 14 on interior surfaces. As depicted in FIGS. 3 to 7, planar bodies 20 are preferably space filling and will provide more than one, preferably two or three and more preferably three semi-continuous or continuous seams in different directions which preferably intersect at an angle with each other (more preferably at an angle of about 60°) in order to allow flexing in multiple directions.

The number of planar bodies 16 may vary widely, the only requirement is that there is at least one planar body 16 affixed to a surface of at least one substrate layer 14. Planar bodies 16 can be affixed using any conventional means, as for example, bolts, screws, thread and the like. In the preferred embodiments of the invention, planar bodies 16 are sewn to at least one surface of each substrate layer 14, and the number and types of planar bodies 16 are such that article 10 has the required flexibility.

The shape of planar bodies 16 and the area percent of layer 14 bonded to planar bodies 16 may vary widely. For example, polymeric layer 16 may be in the form of a sheet or sheet-like (e.g. contiguous or overlapping ribbons, steps, squares and the like (preferably with rounded or truncated edges to minimize damage to substrate layer 14) which form a sheet-like layer) which is bonded to or in contact with 100 percent or substantially one hundred percent of a surface of the fibrous layer. Alternatively, planar bodies 16 may be formed from a plurality of various geometrically shaped polymeric bodies (e.g. ribbons, hexagons, triangles, rectangles, squares, strips) which cover less than 100% of the surface of substrate layer 14. In the preferred embodiments of this invention, polymeric layer 16 is formed from polymeric sheets, strips, ribbons and the like and is bonded to a least about 5 area percent of a major surface of substrate layer 14 based on the total area of said surface. In the more preferred embodiments of the invention, planar bodies 16 is at least about 20 area percent of a major surface of substrate layer 14, and in the most preferred embodiments of the invention, planar bodies 16 is at least about 50 area percent of a major surface of a substrate layer 14.

Figure 11:
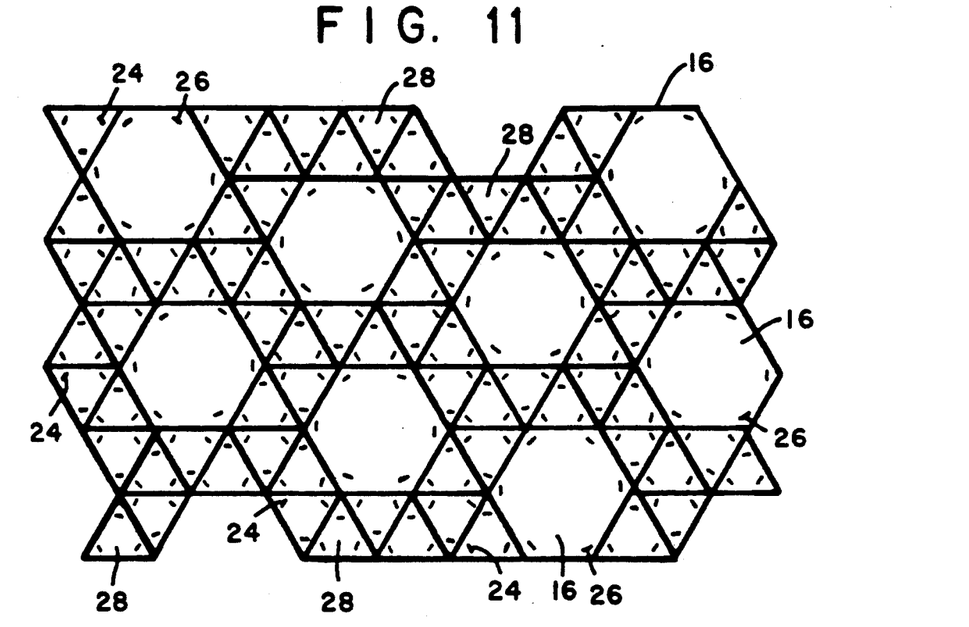
FIG. 11 is a frontal view of an embodiment of this invention having shaped, rigid non-metallic panels sewn to a substrate in which the panels are in the shape of equilaterval triangles and hexagons.
Figure 12:
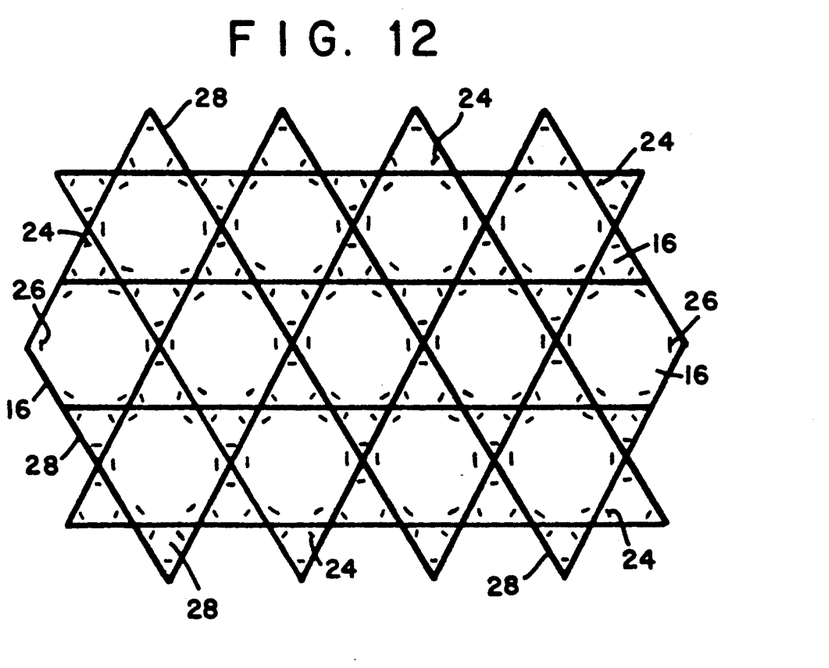
FIG. 12 is a frontal view of another embodiment of this invention having shaped, rigid non-metallic panels sewn to a substrate in which the panels are in the shape of equilateral triangles and hexagons.

Affixation of a planar bodies 16 to a substrate layer 14 as continuous sheet may cause stiffening of the structure. Although for certain applications this may be acceptable provided that article 10 has the required degree of flexibility, for many applications where relatively high penetration resistance and flexibility are desired, such as a ballistic resistant vest, it is desirable to affix planar bodies 16 to substrate layer 14 such that the desired flexibility is obtained. As shown in the Figures, this is preferably accomplished by affixing planar bodies 16 as discontinuous geometric shapes. In these applications, it is preferred that planar bodies layer 16 include highly penetration resistant structures formed from rigid ballistic resistant materials. Preferred geometric shapes will be space filling and will provide at least one, more preferably two or three, and most preferably three different directions for continuous or semi continuous (preferably continuous) seams, where seam directions (which are at an angle to each other, preferably at an angle of about 60) in order to allow flexing in multiple directions as depicted in FIGS. 5 to 12. Such constructions regardless of the thickness and rigidity of planar bodies 16 can drape around doubly curved surfaces and thus exhibit the desired flexibility. (See FIGS. 7 to 10). Primarily because of the improved flexibility a preferred construction consists of an arrangement of triangular shaped bodies 16 (preferably right angle triangles, equilateral triangles or a combination thereof and more preferably equilateral triangles) which are arranged to be space filling as depicted in FIGS. 6 to 12. A desirable modification to this construction is the inclusion of compatible geometric shapes such as hexagons, parallelograms, trapezoids and the like, which correspond to shapes obtainable by fusion of two or more triangles at appropriate edges. As depicted in FIGS. 11 and 12, a most preferred compatible geometric shape is a hexagon. It should be noted that while in FIGS. 11 and 12 the hexazonal triangular shaped bodies are positioned on the same surface of layer 14, such positioning is not critical, and such bodies 16 can be conveniently placed on more than one surface as for example in FIGS. 3 to 10. Such space filling constructions allow a wide range of compromises between flexibility, minimization of seams and maximization of penetration resistance.

Figure 13:
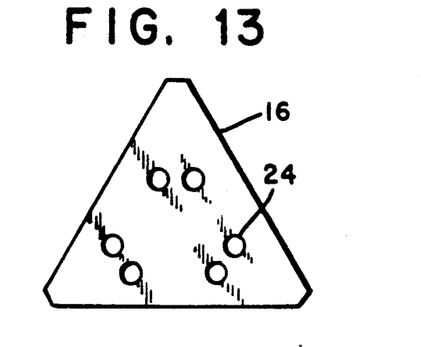
FIG. 13 is a frontal view of a truncated equilateral triangular shaped rigid non-metallic body.

As depicted in FIG. 13, one or more of the apexes of planar bodies 16 are preferably truncated or rounded which also enhances flexibility by allowing substrate layer 14 to flex away from body 16 between the attachment point and the perimeter. Planar bodies 16 preferably include eyes 24 for stitching planar bodies 16 to a surface of layers 14 by way of stitches. Additional flexibility can be achieved by providing spaces between substrate layer 14 and planar bodies 16. In these preferred embodiments, curvilinear planar bodies 16 such as a circular or oval shaped body 16 (not depicted) are positioned at the truncated or rounded apexes to provide for additional penetration resistance. Alternatively a mixture of totally partially truncated or planar bodies 16 and partially truncated or untruncated planar bodies 16 can be used in which the open areas at the truncated end can be covered by the un-truncated end of the partially truncated or untruncated adjacent planar body 16.

Figure 7:
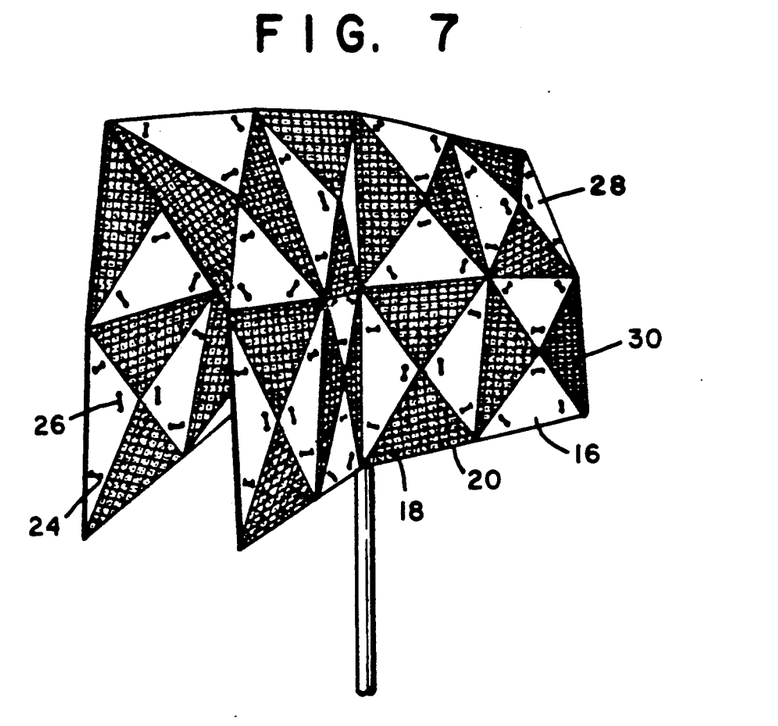
FIG. 7 is a sideview of the construction depicted in FIG. 6.
Figure 8:
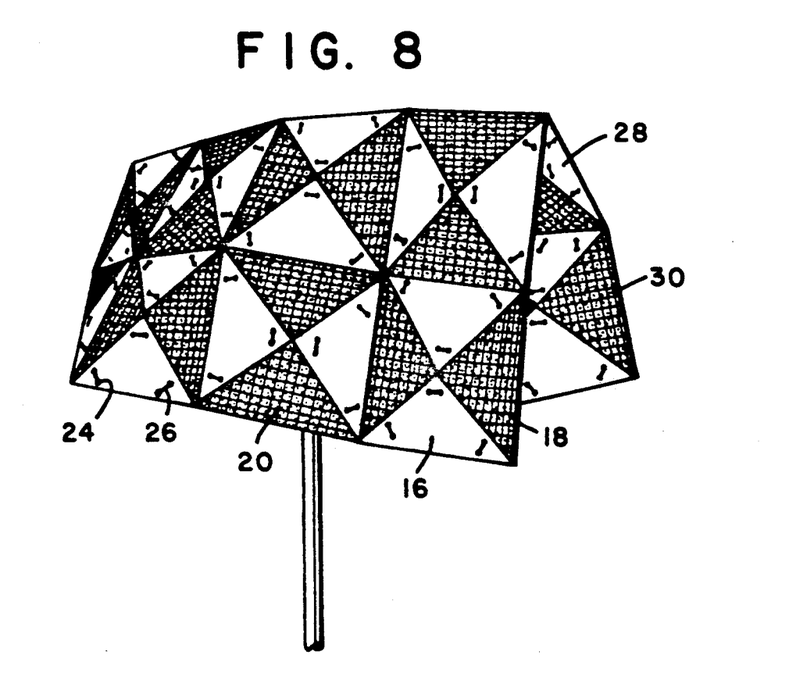
FIG. 8 is a sideview of the construction depicted in FIG. 6, where the viewing direction is 90° from that of FIG. 7.
Figure 9:
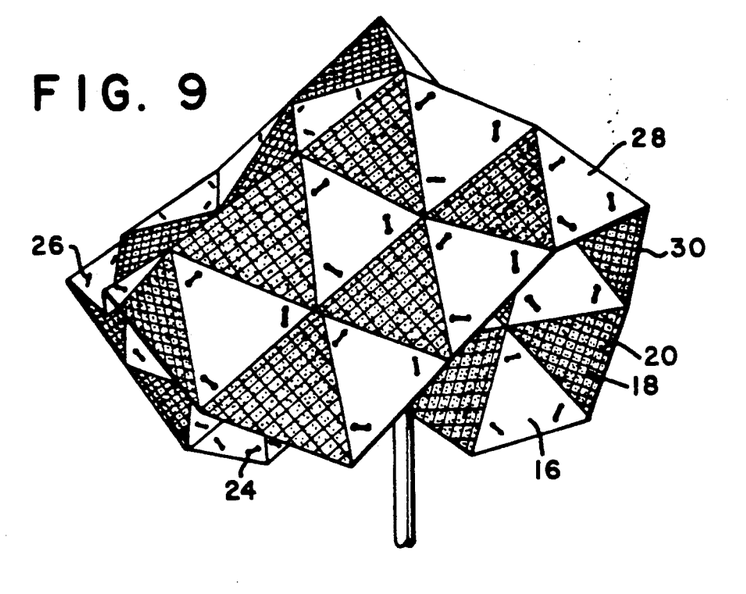
FIG. 9 is a sideview of the construction depicted in FIG. 5.
Figure 10:
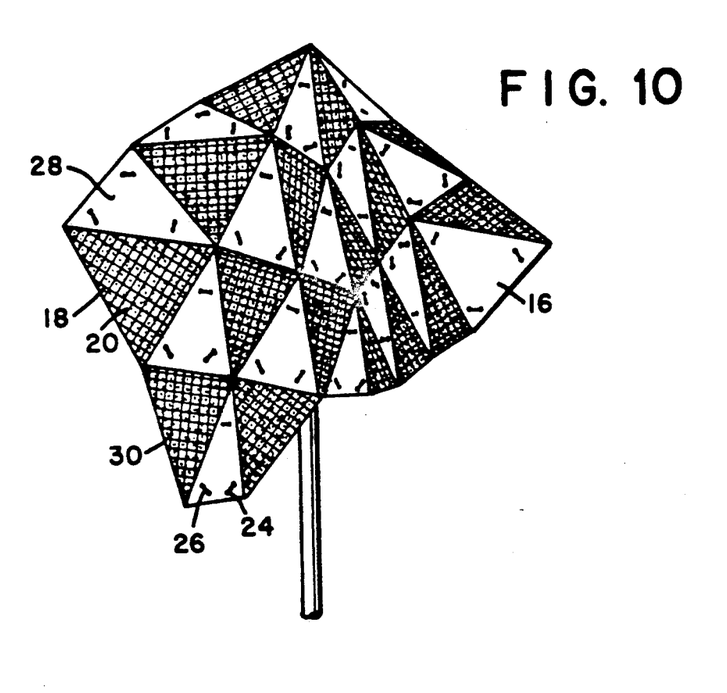
FIG. 10 is a sideview of the construction depicted in FIG. 5 where the viewing direction is 90° from that of FIG. 9

The shape of planar bodies 16 may vary widely. For example, planar bodies 16 may be of regular shapes such as hexagonal, triangular, square, octagonal, trapezoidal, parallelogram and the like, or may be irregular shaped bodies of any shape or form. In the preferred embodiments of this invention, planar bodies 16 are regular shaped bodies, irregularly shaped bodies or combination thereof preferably having truncated edges which completely or substantially completely (at least 90% area) cover the surface of substrate layer 14. In the more preferred embodiments of the invention, planar bodies 16 are of regular shape and in the most preferred embodiments of the invention planar bodies 16 are triangular shaped bodies (preferably right angles, equilateral triangles or a combination thereof and more preferably equilateral triangles as depicted in FIGS. 4 and 7, or a combination of triangular shaped bodies and hexagon shaped bodies as depicted in FIGS. 11 and 12, which provide for relative improved flexibility relative to ballistic article having planar bodies 18 of other shapes of equal area.

Planar bodies 16 are comprised of a rigid ballistic material which may vary widely depending on the uses of article 10, and may offer additional ballistic protection. The term "rigid" as used in the present specification and claims is intended to include semi-flexible and semi-rigid structures that are not capable of being free standing, without collapsing. The materials employed in the fabrication of planar bodies 16 may vary widely and may be any penetration resistant non-metallic material. Illustrative of such materials are those described in G. S. Brady and H. R. Clauser, *Materials Handbook*, 12th Ed. (1986). Useful materials include high modulus polymeric materials such as polyamides as for example aramids, nylon-66, nylon-6 and the like; polyesters such as polyethylene terephthalate, polybutylene terephthalate, and the like; acetalo; polysulfones; polyethersulfones; polyacrylates; acrylonitrile/butadiene/styrene copolymers; poly(amideimide); polycarbonates; polyphenylenesulfides; polyurethanes; polyphenyleneoxides; polyester carbonates polyesterimides; polymidies; polyetherimides; polymides; polyetheretherketone; epoxy resins; phenolic resins; polysulfides; silicones; polyacrylates; polyacrylics; polydienes; vinyl ester resins, modified phenolic resins; unsaturated polyester; allylic resins; alkyd resins, melamine and urea resins; polymer alloys and blends of thermoplastic resins one or more thermoseting resins and combinations one or more thereof; and interpenetrating polymer networks such as those of polycyanate ester of a polyol such as the dicyanoester of bisphenol-A and a thermoplastic such as a polysulfone.

Planar bodies 16 may comprise a network of fibers as for example those described for use in the fabrication of fibrous substrate layer 14 preferably aramid fibers, such as Kevlar ® 29,49, 129 and 149 aramid fibers, polyethylene fibers such as Spectra ® 900 and Spectra ® 1000 polyethylene fibers and combinations thereof dispersed in a matrix of one of more polymeric materials such as one or more thermoplastic resins one or more thermosetting resins or a combination thereof, such as polymers used to form the fibers of fibrous substrate layers 14. In these embodiments of the invention, the fibers are dispersed in a continuous phase of a matrix material which preferably substantially coats each filament contained in the fiber. The manner in which the filaments are dispersed may vary widely. The filaments may be aligned in a substantially parallel, unidirectional fashion, or filaments may by aligned in a multidirectional fashion with filaments at varying angles with each other. In the preferred embodiments of this invention, filaments in each layer are aligned in a substantially parallel, unidirectional fashion such as in a prepreg, pultruded sheet and the like. One such suitable arrangement is where the polymeric layer comprises a plurality of layers or laminates in which the coated filaments are arranged in a sheet-like array and aligned parallel to one another along a common filament direction. Successive layers of such coated, uni-directional filaments can be rotated with respect to the previous layer to form a relatively flexible composite. An example of such laminate structures are composites with the second, third, fourth and fifth layers rotated +45°, −45°, 90° and 0°, with respect to the first layer, but not necessarily in that order. Other examples include composites with 0°/90° layout of yarn or filaments. Techniques for fabricating these laminated structures are described in greater detail in U.S. Pat. Nos. 4,916,000; 4,623,574; 4,748,064; 4,457,985 and 4,403,012.

Useful materials for the fabrication of planar bodies 18 also include multilayered fabric or fibrous composites in which the fabric or fibrous layers are secured by some securing means as for example stitching, adhesive, bolts, staples and the like. These fabrics can be woven armor and can be formed from the fibers described above for use in the fabrication of fibrous substrate layer 14 such as aramid fibers (such as Kevlar ® 29, 49, 129 and 149 aramid fibers) polyethylene fibers (such as Spectra ® 900 and Spectra ® 1000 polyethylene fibers) and combinations thereof.

Planar bodies 16 may also be formed from metal and non-metal ceramics. Illustrative of useful metal and non-metal ceramics are as those described in C. F. Liable, *Ballistic Materials and Penetration Mechanics*, Chapters 5-7 (1980) and include single oxides such as aluminum oxide ($Al_2O_3$), barium oxide (BaO), beryllium oxide (BeO), calcium oxide (CaO), cerium oxide ($Ce_2O_3$ and $CeO_2$), chromium oxide ($Cr_2O_3$), dysprosium oxide ($Dy_2O_3$), erbium oxide ($Er_2O_3$), europium oxide: (EuO, $Eu_2O_3$, and $Eu_2O_4$), ($Eu_{16}O_{21}$), gadolinium oxide ($Gd_2O_3$), hafnium oxide ($HfO_2$), holmium oxide ($Ho_2O_3$), lanthanum oxide ($La_2O_3$), lutetium oxide ($Lu_2O_3$), magnesium oxide (MgO), neodymium oxide ($Nd_2O_3$), niobium oxide: (NbO, $Nb_2O_3$, and $NbO_2$), ($Nb_2O_5$), plutonium oxide: (PuO, $Pu_2O_3$, and $PuO_2$), praseodymium oxide: ($PrO_2$, $Pr_6O_{11}$, and $Pr_2O_3$), promethium oxide ($Pm_2O_3$), samarium oxide (SmO and $Sm_2O_3$), scandium oxide ($Sc_2O_3$), silicon dioxide ($SiO_2$), strontium oxide (SrO), tantalum oxide ($Ta_2O_5$), terbium oxide ($Tb_2O_3$ and $Tb_4O_7$), thorium oxide ($ThO_2$), thulium oxide ($Tm_2O_3$), titanium oxide: (TiO, $Ti_2O_3$, $Ti_3O_5$ and $TiO_2$), uranium oxide ($UO_2$, $U_3O_8$ and $UO_3$), vanadium oxide (VO, $V_2O_3$, $VO_2$ and $V_2O_5$), ytterbium oxide ($Yb_2O_3$), yttrium oxide ($Y_2O_3$), and zirconium oxide ($ZrO_2$). Useful ceramic materials also include boron carbide, zirconium carbide, beryllium carbide, aluminum beride, aluminum carbide, bor in carbide, titanium carbide, titanium diboride, iron carbide, iron nitride, barium titanate, aluminum nitride, titanium niobate, boron carbide, silicon boride, barium titanate, silicon nitride, calcium titanate, tantalum carbide, graphites, tungsten; the ceramic alloys which include cordierite/MAS, lead zirconate titanate/PLZT, alumina-titanium carbide, alumina-zirconia, zirconia-cordierite/ZrMAS; the fiber reinforced ceramics and ceramic alloys; and glassy ceramics The number of layers 12 included in article 10 of this invention may vary widely depending on the uses of the composite, for example, for those used where article 10 would be used as ballistic protection, the number of layers 12 would depend on a number of factors including the degree of ballistic protection desired and other factors known to those of skill in the ballistic protection art. In general for this application, the greater the degree of protection desired the greater the number of layers 12 included in article 10 for a given weight of the article Conversely, the lesser the degree of ballistic protection required, the lesser the number of layers 12 required for a given weight of article 10.

As depicted in the Figures, article 10 preferably at least two layers 14. In these preferred embodiments; layer 14 of a layer 14 is partially covered with planar bodies 16 forming an alternating patterns of covered areas 28 and uncovered areas 30. At least one other layer 14 (preferably adjacent) also includes a layer 14 partially covered with planar bodies forming covered areas 28 and uncovered areas 30 of layer 14 such that uncovered areas 30 of one layer 14 completely correspond to covered areas 30 of another layer 14 and vice versa. Alternatively, article 10 includes at least one layer 12, having planar bodies 16 affixed to both sides to form a similar overlapping pattern of coverage by planar bodies 16. In each case, bodies 16 may be totally or partially truncated or otherwise modified so that they may be affixed such that the covered area is uniformly larger than the uncovered area. Moreover, various other modifications can be used to cover areas exposed by the truncated ends of bodies 16. In the more preferred embodiments of the invention the correspondence between the uncovered areas of one layer 14 and planar bodies 16 on another layer 14 or the other side of the same layer 14 is complete or substantially complete. In the more preferred embodiments, planar body 16 on a layer 14 is uniformly larger than its corresponding uncovered area 30 thereby providing complete coverage of or overlap of the corresponding uncovered areas 30 of the same or another layer 14.

Figure 5:
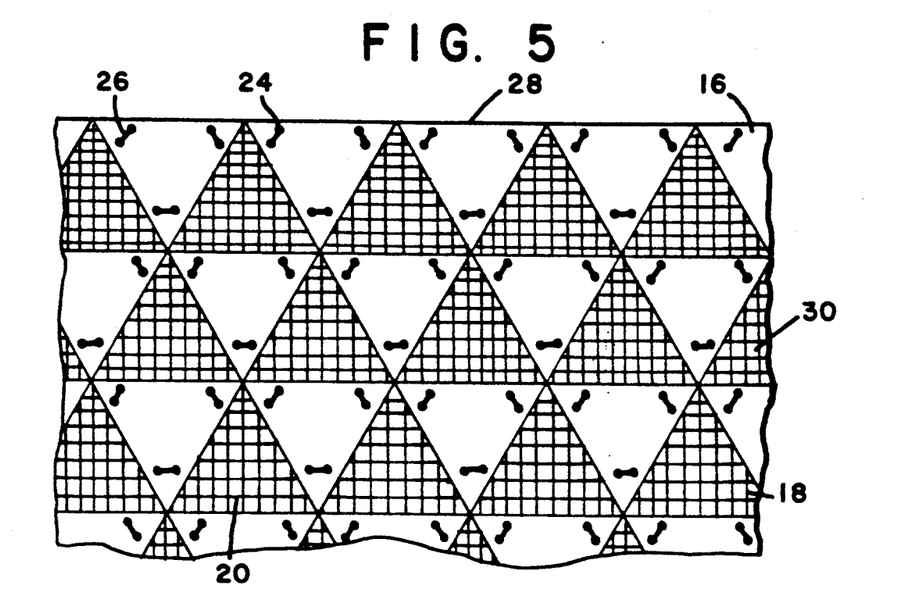
FIG. 5 is a fragmentary frontal view of the body armor of this invention of FIG. 2 in which certain selected layers have been cut away to depict equilateral triangular shaped rigid panels laminated and sewn on both sides of a stitched fabric.
Figure 6:
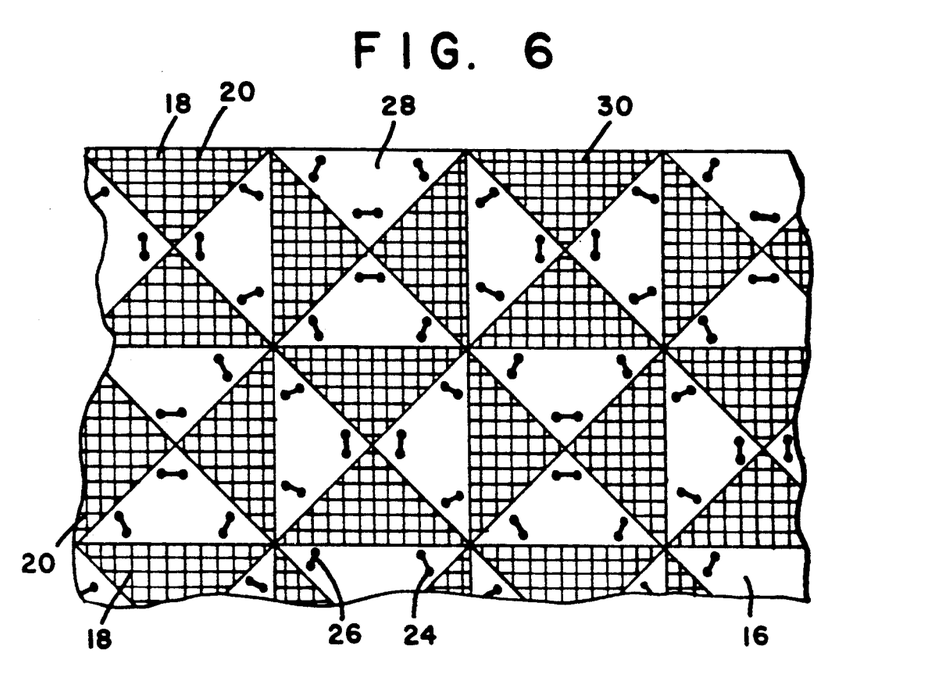
FIG. 6 is a fragmentary frontal view of the body armor of this invention of FIG. 3 in which certain selected layers have been cut away to depict of right angle triangular shaped rigid panels laminated and sewn on both sides of a stitched fabric.

The articles of this invention may be fabricated through use of conventional techniques. For example, bodies 16 may be sewn to layer 12 using conventional sewing techniques, preferably at two or more apexes of body 16 (more preferably more than two), preferably a distance from the edge of a body 16 as depicted in FIGS. 4, 5 and 12. By sewing a distance from the edge a body 16 flexibility is enhanced. To prevent extensive disalignment between various layer 12, adjacent layers can be stitched together.

The thread used to stitch bodies 16 to substrate layer 12 can vary widely, but is preferably a relatively high modulus (equal to or greater than about 200 grams/denier) and a relatively high tenacity (equal to or greater than about 15 grams/denier) fiber is used. All tensile properties are evaluated by pulling a 10 in. (25.4 cm) fiber length clamped in barrel clamps at a rate of 10 in./min (25.4 cm/min), on an Instron tensile tester. In the preferred embodiments of the invention, modulus is from about 400 to about 3000 grams/denier and the tenacity is from about 20 to about 50 grams/denier, more preferably the modulus is from about 1000 to about 3000 grams/denier and the tenacity is from about 25 to about 50 grams/denier and most preferably the modulus is from about 1500 to about 3000 grams/denier and the tenacity is from about 30 to about 40 grams/denier.

The type of thread or fiber employed to stitch bodies 16 to substrate layer 12 may vary widely and include those fibers described in detail herein above in the discussion of fiber for use in the fabrication of fibrous layer 12. However, the thread or fiber used in stitching means is preferably an aramid fiber or thread, an extended chain polyethylene thread or fiber, a nylon thread or fiber or a mixture thereof.

The composites of this invention can be used for conventional purposes. For example, such composites can be used in the fabrication of penetration resistant articles and the like using conventional methods. For example, such penetration resistant articles include meat cutter aprons, protective gloves, boots, tents, fishing gear and the like.

The articles are particularly useful as a "bulletproof" vest material or ballistic resistant articles such as "bulletproof" lining for example, or a raincoat because of the flexibility of the article and its enhanced ballistic resistance.

In ballistic studies, the specific weight of the shells and plates can be expressed in terms of the areal density (ADT). This areal density corresponds to the weight per unit area of the ballistic resistant armor. In the case of filament reinforced composites, the ballistic resistance of which depends mostly on filaments, another useful weight characteristic is the filament areal density of the composite. This term corresponds to the weight of the filament reinforcement per unit area of the composite (AD).

The following examples are presented to provide a more complete understanding of the invention and are not to be construed as limitations thereon.

EXAMPLE 1

Ten layers of Fabric A (Ballistic Nylon fabric (Style 000-26042 Burlington Industries, plain weave 33×33 yarns/inch. (13×13 yarns/cm)) were sewn together using Nylon sewing thread. Sewing was carried out in both the warp and fill directions to produce a sewn grid with seam distances of $\frac{1}{4}$ inch (0.64 cm) in both the warp and fill directions. The resultant 15 inch square (38 cm square) panel was quite stiff, as illustrated by the Drape test 1, where a 20 cm overhang over the straight edge of a horizontal flat plane caused the free hanging side to be only approximately 0.5 cm. below the flat horizontal supporting surface. The areal density of this panel was 2.9 kg/m$^2$ and is designated panel A.

EXAMPLE 2

Panel A of Example 1 was cut, using a heat knife into equilateral triangles having side length of 3 inches (7.6 cm). The entire surface of one side of the fabric triangles was covered with a double stick foam tape and then laminated onto a 13 inch square (33 cm square) of a single layer of fabric A. The resultant construction was subjected to the Drape Test. Overhang from a horizontal surface was 19 cm (along a continuous seam) and the unsupported rectangle assumed a vertical position, with the far edge 19 cm below the horizontal surface.

EXAMPLE 3

Panel A was cut, using a heat knife into equilateral triangles having side length of 3 inches (7.6 cm). The triangles were sewn onto a 13 inch square (33 cm square) of a single layer of fabric A at three points, with each sewing point being 2.5 cm in from the closest apex. The resultant construction was subjected to the Drape Test. Overhang form a horizontal surface was 19 cm (along a continuous seam) and the unsupported rectangle assumed a vertical position, with a far edge 19 cm below the horizontal surface. The panel readily draped around doubly curved surfaces. Constructions of this type are suitable a variety of protective uses, including incorporation into ballistic resistant clothing and ballistic resistant curtains or drapes.

What is claimed is:

1. A flexible penetration resistant article of manufacture comprising at least one substrate layer comprising a plurality of rigid penetration resistant non-metallic planar bodies affixed to a surface thereof such that said article has at least three continuous or semi-continuous seams in which the seam directions intersect at an angle, wherein said article is capable of flexing along said seams.

2. An article as recited in claim 1 wherein said planar bodies have regular shapes.

3. An article as recited in claim 1 wherein apexes of said planar bodies are truncated.

4. An article as recited in claim 1 wherein said planar bodies are affixed to said surface of said substrate by one or more points of mechanical affixation which are spaced from the boundary of said bodies.

5. An article as recited in claim 1 wherein said bodies are sewn to a substrate layer.

6. An article as recited in claim 2 wherein said seams are continuous.

7. An article as recited in claim 6 wherein seam directions are at an angle of about 60°.

8. An article as recited in claim 6 wherein said planar bodies are of a triangular shape, or is a combination of trapezoidal, parallelogram shaped hexagonal and triangular shape bodies.

9. An article as recited in claim 8 wherein said triangular shaped bodies are in the shape of or substantially of the shape of right angle triangles, equilateral triangles or a combination thereof.

10. An article as recited in claim 9 wherein said triangular bodies are in the shape of or substantially of the shape of equilateral triangles.

11. An article as recited in claim 8 wherein said substrate layer is a fibrous layer comprising a network of fibers.

12. An article as recited in claim 11 wherein said substrate layer is a fibrous layer comprising a network of high strength fibers having a tensile strength of at least about 7 grams/denier, a tensile modulus of at least about 160 grams/denier and an energy-to-break of at least about 30 joules/gram.

13. An article as recited in claim 12 wherein the fibers have a tenacity equal to or greater than about 10 g/d, a tensile modulus equal to or greater than about 150 g/d and an energy-to-break equal to or greater than about 10 j/g.

14. An article as recited in claim 13, wherein said tenacity is equal to or greater than about 20 g/d, said modulus is equal to or greater than about 500 g/d, and said energy-to-break is equal to or greater than about 15 j/g.

15. An article as recited in claim 14 wherein said tenacity is equal to or greater than about 25 g/d, said modulus is equal to or greater than about 1000 g/d, and said energy-to-break is equal to or greater than about 20 j/g.

16. An article as recited in claim 13 wherein said tenacity is equal to or greater than about 30 g/d, said modulus is equal to or greater than about 1300 g/d, and said energy-to-break is equal to or greater than about 30 j/g.

17. An article as recited in claim 11 wherein said fibers are polyethylene fibers, aramid fibers, nylon fibers, glass fibers or mixtures thereof.

18. An article as recited in claim 17 wherein said fibers are polyethylene fibers.

19. An article as recited in claim 17 wherein said fibers are aramid fibers.

20. An article as recited in claim 17 wherein said fibers are a mixture of at least two of polyethylene fibers, nylon fibers, aramid fibers and glass fibers.

21. An article as recited in claim 17 wherein said fibers are glass fibers.

22. An article as recited in claim 17 wherein said substrate layer comprises at least one sheet-like fiber array in which said fibers are arranged substantially parallel to one another along a common fiber direction.

23. An article as recited in claim 22 wherein said substrate layer comprises more than one array, with adjacent arrays aligned at an angle with respect to the longitudinal axis of the parallel filaments contained in said adjacent array.

24. An article as recited in claim 23 wherein said angle is from about 45° to about 90°.

25. An article as recited in claim 24 wherein said angle is about 90°.

26. An article as recited in claim 17 wherein said substrate layer comprises a non-woven fabric or a woven fabric.

27. An article as recited in claim 17 wherein said fibrous layer comprises a woven fabric.

28. An article as recited in claim 17 wherein said substrate layer comprises fibrous network in a polymer matrix.

29. An article as recited in claim 28 wherein said fibrous network comprises a sheet-like fiber array in which said fibers are arranged substantially parallel to one another along a common fiber direction.

30. An article as recited in claim 29 wherein said network comprises a plurality of sheet-like fiber arrays in which adjacent arrays are aligned at an angle with the common fiber direction of the parallel fibers contained in said arrays.

31. An article as recited in claim 30 wherein said angle is from about 45° to about 90°.

32. An article as recited in claim 31 wherein said angle, is about 90°.

33. An article as recited in claim 17 wherein said planar bodies are formed from a ceramic, a polymeric composite, multilayered fiber composite or a combination thereof.

34. An article as recited in claim 33 where said rigid planar bodies are a polymeric composite, a multilayered fiber composite or a combination thereof.

35. An article as recited in claim 34 wherein said planar bodies comprise a polymeric composite, which comprises a fibrous network of inorganic fibers, organic fibers or a combination thereof in a polymeric matrix.

36. An article as recited in claim 35 wherein said fibrous network comprises aramid fibers, glass fibers, polyethylene fibers or a combination thereof.

37. An article as recited in claim 36 wherein said fibrous network comprises one or more sheet-like fibers arrays in which the fibers in each array are arranged substantially parallel to one another along a common filament direction.

38. An article as recited in claim 37 wherein said fibrous network comprises more than one fiber array, with adjacent arrays aligned at an angle with respect to the longitudinal axis of the parallel fibers contained in said arrays.

39. An article as recited in claim 38 wherein said angle is from about 45° to about 90°.

40. An article as recited in claim 39 wherein said angle is about 90°.

41. An article as recited in claim 36 wherein said fiber are aramid fiber, polyethylene fibers or a combination thereof.

42. An article as recited in claim 33 wherein said planar bodies are a multilayered fiber composite wherein all or a portion of said layers are secured together.

43. An article as recited in claim 42 wherein said fiber are aramid fibers, glass fibers, polyethylene fibers, nylon fibers or a combination thereof.

44. An article as recited in claim 43 wherein said fibers are aramid fibers, polyethylene fibers or a combination thereof.

45. An article as recited in claim 44 or 36 wherein, said fibers are aramid fibers.

46. An article as recited in claim 44 or 36 wherein said fibers are polyethylene fibers.

47. An article as recited in claim 44 or 36 wherein said fibers are a combination of aramid fibers and polyethylene fibers.

48. An article as recited in claim 36 or 44 wherein said fibers is a combination of at least two of glass fibers, nylon fibers, aramid fibers and polyethylene fibers.

49. An article as recited in claim 36 or 44 which comprises first and second composite layers, each of which is partially covered by a plurality of said planar bodies forming a pattern of covered and uncovered area, said first and second composite layers positioned such that the uncovered areas of the surface of one layer are in correspondence and alignment with the covered areas of the surface of the other layer.

50. An article as recited in claim 49 wherein said first and second layers are adjacent.

51. An article as recited in claim 49 wherein the uncovered areas of the surface of a layer are uniformly smaller than the corresponding covered areas of the other layer.

* * * * *